J. P. HILL.
DEVICE FOR CUTTING TWINE.
APPLICATION FILED JAN. 7, 1915.
1,195,584.
Patented Aug. 22, 1916.
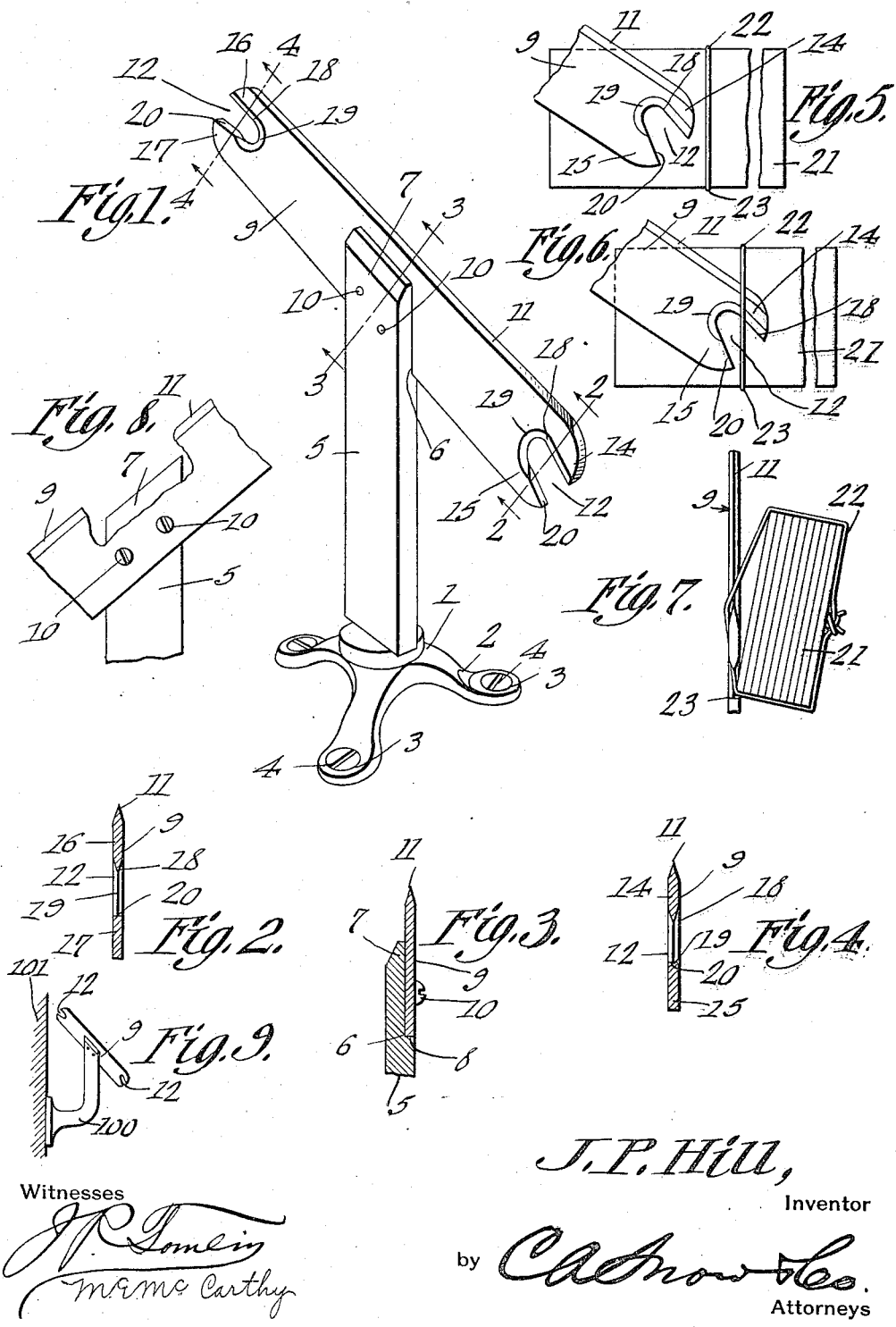
Witnesses
J. R. Tomlin
M. McCarthy
J. P. Hill,
Inventor
by C. A. Snow & Co.
Attorneys

UNITED STATES PATENT OFFICE.

JOHN PETER HILL, OF ROCKYMOUNT, VIRGINIA.

DEVICE FOR CUTTING TWINE.

1,195,584.  Specification of Letters Patent.  Patented Aug. 22, 1916.

Application filed January 7, 1915. Serial No. 1,006.

*To all whom it may concern:*

Be it known that I, JOHN P. HILL, a citizen of the United States, residing at Rockymount, in the county of Franklin and State of Virginia, have invented a new and useful Device for Cutting Twine, of which the following is a specification.

The device forming the subject matter of this application is adapted to be employed by postmasters, storekeepers and others for cutting twine from a ball, after one end of the twine has been secured about a package, the construction of the device being such that the same may be employed for severing the wrapping which is disposed about a package.

The invention aims to provide a structure of the sort above mentioned which may be employed for cutting wrappings on packages of different sizes: to provide novel means whereby the twine cutting prong may be directed between the package and the wrapping thereon: and to provide a novel means whereby a cutting or marring of the package will be avoided during the cutting operation.

It is within the scope of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in perspective; Fig. 2 is a cross section on the line 2—2 of Fig. 1; Fig. 3 is a cross section on the line 3—3 of Fig. 1; Fig. 4 is a cross section on the line 4—4 of Fig. 1; Figs. 5 and 6 are diagrammatic side elevations illustrating different steps in the cutting process; Fig. 7 is a fragmental end elevation illustrating the application of the invention; Fig. 8 is a fragmental side elevation showing the means whereby the cutting bar is held on the standard. Fig. 9 is an elevation showing a slight modification in the invention.

In carrying out the invention there is provided a base denoted generally by the numeral 1. The base 1 may comprise legs 2 provided with openings 3 adapted to receive securing elements 4 whereby the base may be connected with a support, such as a table or counter. Fixed to and upstanding from the base 1 is a standard 5 which preferably is of rectangular cross section. At one side and adjacent its upper end, the standard 5 is cut away as shown at 6 to define a thinned lip 7 and to form at the base of the lip 7 a shoulder 8 which, as clearly shown in Fig. 8 is downwardly and forwardly inclined toward the operator. The standard 5 ordinarily is disposed vertically.

Supported against vertical movement on the shoulder 8 and restrained against lateral movement in one direction by the lip 7 is a bar 9. Securing elements 10 preferably screws pass through openings in the bar 9 and are threaded into openings in the lip 7, thereby to hold the bar 9 in place on the shoulder 8 and in lateral abutment with the lip 7. The upper and lower edges of the bar 9 preferably are parallel, so that the upper edge of the bar slants downwardly and forwardly at an angle defined by the angle existing between the shoulder 8 and the horizontal. The upper edge of the bar 9 is sharpened as indicated at 11 to form a cutting edge substantially co-equal in length with the bar. In the ends of the bar 9 notches 12 are formed. These notches 12 define at the lower end of the bar, a prong 14 and an arm 15 disposed below the prong. Similarly, at the upper end of the bar 9 there is formed a prong 16 and an arm 17 below the prong 16. The lower edges of the prongs 14 and 16 are sharpened as indicated at 18, and the cutting edge thus defined is extended as shown at 19 across the base of the notch 12. The upper edge of the arms 15 and 17 however are blunt as shown at 20.

Supposing that it is desired to sever a piece of twine one end of which has been tied about a package, the twine is drawn downwardly and forwardly along the cutting edge 11. If, however, it is desired to sever a binder which has already been placed about a package, the package, denoted by the numeral 21 is placed against the side face of the bar 9 as shown in Fig. 5 and the package is moved toward the end of the bar 9 until the binder 22 on the package enters the notch 12, reference being had to Figs. 5 and 6. During this operation, the arm 15 bears against the side face of the package and prevents the package from being cut by the edge 18 of the prong 14. The binder 22 on the package 21 may be severed under the action of the cutting edge 18 or the cutting edge 19. While the package is being moved in the manner hereinbefore described, to effect the cutting operation, there is a natural tendency to swing the package 21 laterally as shown in Fig. 7, in order that the hand of the operator may be spaced from the cutting edge 11. The lower edge of the package 21, indicated at 23 therefore tends to ride along the upper edge of the arm 15, which upper edge is blunted, so that the package will not be cut or injured, a clear understanding of the foregoing features being obtained when Figs. 6 and 7 are compared.

Owing to the fact that the bar is downwardly and forwardly inclined, the ends of the bar are located at different heights. The forward cutting edge 18, therefore, may be employed for severing the binder on a comparatively small package, whereas, if a larger package is to be handled, the binder on the package is cut by the edge 18 on the rear prong 16.

As shown at 100 in Fig. 9 the standard may be given a bend in order to enable the device to be applied to an upright element such as the side wall 101 of a car.

Owing to the fact that the bar 9 is removably held in place by means of the screws 10, the bar may be detached for the purpose of sharpening the same or to permit the substitution of another bar.

Having thus described the invention, what is claimed is:—

A twine cutter comprising a standard; and a bar secured intermediate its ends to the standard, the bar being provided in its ends with notches each defining a prong and an arm disposed below the prong, the lower edges of the prongs and the bases of the notches being sharpened to form cutting edges, the bar being disposed at an angle to the horizontal, thereby to dispose the cutting edges at different heights, whereby the said cutting edges, respectively, may be made efficient for cutting wrappings on packages of different sizes, the arm forming a package-contacting guide for the prong, and the upper edge of the arm being dulled to form a package-deflecting element, the upper edge of the bar being sharpened to form a cutting edge extending from one prong to the other.

In testimony that I claim the foregoing as my own, I have hereto affixed my signature in the presence of two witnesses.

JOHN PETER HILL.

Witnesses:
BEDFORD S. ROBERTSON,
CHAS. J. DAVIS.

Copies of this patent may be obtained for five cents each, by addressing the "Commissioner of Patents, Washington, D. C."